United States Patent
Xiong et al.

(10) Patent No.: US 9,251,689 B2
(45) Date of Patent: Feb. 2, 2016

(54) STATUS MONITORING, STORAGE AND REPORTING FOR OPTICAL TRANSCEIVERS BY TRACKING OPERATING PARAMETER VARIATIONS

(71) Applicant: Source Photonics, Inc., Chatsworth, CA (US)

(72) Inventors: Yaxi Xiong, Chengdu (CN); Todd Rope, Glendale, CA (US); Haifeng Zeng, Chengdu (CN)

(73) Assignee: Source Photonics, Inc., Chatsworth, CA (US)

( * ) Notice: Subject to any disclaimer, the term of this patent is extended or adjusted under 35 U.S.C. 154(b) by 36 days.

(21) Appl. No.: 14/342,361

(22) PCT Filed: Feb. 27, 2014

(86) PCT No.: PCT/CN2014/072594
§ 371 (c)(1),
(2) Date: Feb. 28, 2014

(87) PCT Pub. No.: WO2015/127612
PCT Pub. Date: Sep. 3, 2015

(65) Prior Publication Data
US 2015/0243155 A1    Aug. 27, 2015

(51) Int. Cl.
*H04B 10/00* (2013.01)
*G08B 21/18* (2006.01)
*H04B 10/40* (2013.01)
*H04B 10/079* (2013.01)

(52) U.S. Cl.
CPC .......... *G08B 21/182* (2013.01); *H04B 10/0795* (2013.01); *H04B 10/40* (2013.01)

(58) Field of Classification Search
USPC .................................................. 398/135–139
See application file for complete search history.

(56) References Cited

U.S. PATENT DOCUMENTS

| | | | |
|---|---|---|---|
| 5,956,168 A * | 9/1999 | Levinson et al. | 398/41 |
| 6,952,531 B2 * | 10/2005 | Aronson et al. | 398/137 |
| 7,079,775 B2 * | 7/2006 | Aronson et al. | 398/137 |
| 7,177,547 B1 * | 2/2007 | Case et al. | 398/135 |
| 7,200,336 B2 * | 4/2007 | Yu et al. | 398/135 |
| 7,200,337 B2 * | 4/2007 | Hosking et al. | 398/136 |
| 7,302,186 B2 * | 11/2007 | Light et al. | 398/137 |
| 7,359,643 B2 * | 4/2008 | Aronson et al. | 398/136 |
| 7,650,077 B2 * | 1/2010 | Yu et al. | 398/137 |
| 7,894,723 B2 * | 2/2011 | Moriwaki et al. | 398/135 |
| 7,912,375 B2 * | 3/2011 | Kondo et al. | 398/135 |
| 8,798,475 B2 * | 8/2014 | Rope | 398/135 |
| 8,842,993 B2 * | 9/2014 | Rope | 398/137 |

(Continued)

*Primary Examiner* — Agustin Bello
(74) *Attorney, Agent, or Firm* — Andrew D. Fortney; Central California IP Group, P.C.

(57) ABSTRACT

Methods, architectures, circuits, and/or systems for tracking variations in the operating parameters of an optical or optoelectronic device are disclosed, as well as use of such variation data to monitor or control device functions and/or generate warnings and/or status flags. A method of tracking a variation in one or more operating parameters in an optical or optoelectronic device may include (i) monitoring one or more operating parameters of the device over time to determine values for each of the operating parameters, (ii) calculating the variation in each of the operating parameters as a function of time, (iii) comparing the variation to one or more predetermined thresholds, each threshold corresponding to an operational warning or alarm, and (iv) generating the operational warning or alarm when the variation exceeds the corresponding threshold.

26 Claims, 5 Drawing Sheets

(56) References Cited

U.S. PATENT DOCUMENTS

| | | | |
|---|---|---|---|
| 8,879,909 B2* | 11/2014 | Heimbuch et al. | 398/38 |
| 8,886,033 B2* | 11/2014 | Azadeh | 398/22 |
| 8,934,779 B2* | 1/2015 | Rope et al. | 398/136 |
| 8,989,587 B2* | 3/2015 | Rope et al. | 398/135 |
| 2002/0149821 A1* | 10/2002 | Aronson et al. | 359/152 |
| 2004/0136708 A1* | 7/2004 | Woolf et al. | 398/22 |
| 2004/0136719 A1* | 7/2004 | Hidai et al. | 398/135 |
| 2004/0136720 A1* | 7/2004 | Mahowald et al. | 398/135 |
| 2005/0031352 A1* | 2/2005 | Light et al. | 398/135 |
| 2005/0169636 A1* | 8/2005 | Aronson et al. | 398/136 |
| 2006/0263092 A1* | 11/2006 | Hosking et al. | 398/135 |
| 2006/0269283 A1* | 11/2006 | Iwadate | 398/22 |
| 2008/0205902 A1* | 8/2008 | Moriwaki et al. | 398/182 |
| 2009/0226166 A1* | 9/2009 | Aronson et al. | 398/25 |
| 2010/0150567 A1* | 6/2010 | Kondo et al. | 398/137 |
| 2012/0008962 A1* | 1/2012 | Tanaka | 398/135 |
| 2012/0076502 A1* | 3/2012 | Swanson et al. | 398/136 |
| 2012/0243875 A1* | 9/2012 | Rope | 398/135 |
| 2012/0251100 A1* | 10/2012 | Rope | 398/25 |
| 2013/0177308 A1* | 7/2013 | Rope et al. | 398/25 |
| 2013/0209088 A1* | 8/2013 | Rope et al. | 398/25 |
| 2013/0209090 A1* | 8/2013 | Rope et al. | 398/25 |
| 2013/0251361 A1* | 9/2013 | Azadeh | 398/22 |
| 2013/0287392 A1* | 10/2013 | Heimbuch et al. | 398/38 |
| 2014/0301740 A1* | 10/2014 | Rope | 398/135 |

\* cited by examiner

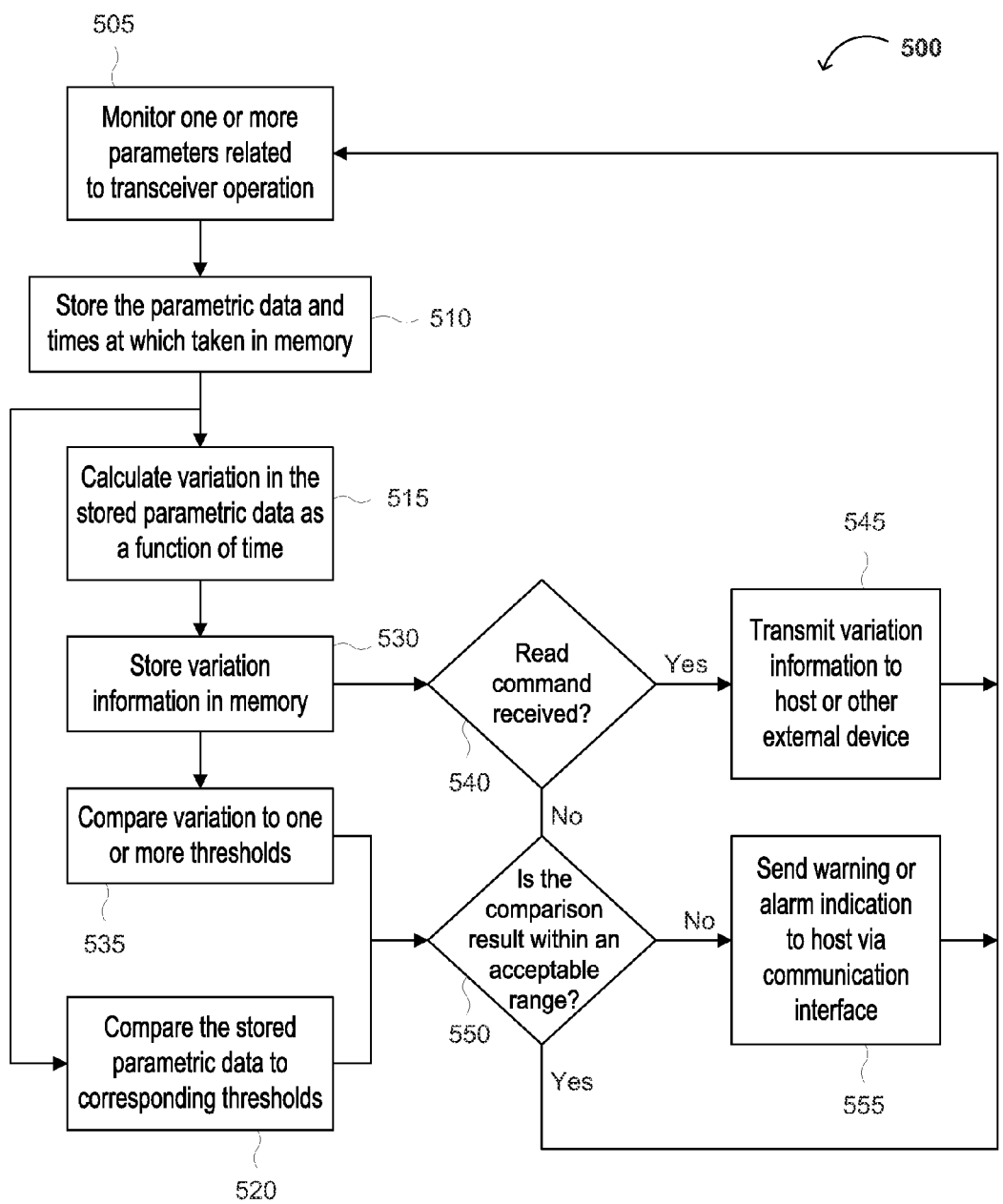

STATUS MONITORING, STORAGE AND REPORTING FOR OPTICAL TRANSCEIVERS BY TRACKING OPERATING PARAMETER VARIATIONS

FIELD OF THE INVENTION

The present invention generally relates to the field of optical devices such as optical receivers, transmitters, transceivers, etc. More specifically, embodiments of the present invention pertain to methods, algorithms, architectures, circuits, software, and/or systems for monitoring operational parameters in optical devices by tracking variations in the operating parameters.

DISCUSSION OF THE BACKGROUND

Optical transceivers send and receive data in an optical form over an optical link, such as a fiber-optic link. An optical transmitter can include laser driver circuitry to drive a laser or diode, such as a light-emitting diode (LED), to create optical pulses on the fiber-optic link from received electronic signals. An optical receiver can include a photosensitive diode to receive optical signals, which are then converted into electronic signals. Thus, an optical transceiver converts (i) optical signals into analog and/or digital electronic signals, and (ii) electronic signals into optical signals.

In order to determine if the optical transceiver is functioning correctly, various operational parameters are monitored. Flags are then generated to demonstrate the status of the operational parameters. In conventional approaches, the flags indicate whether a parameter is greater than or less than a predetermined threshold value. For example, a flag may indicate that a monitored temperature value is slightly greater than a predetermined temperature value (e.g., a high temperature warning threshold). In some embodiments, a flag may indicate that a monitored temperature value is significantly greater than a predetermined temperature value (e.g., a high temperature alarm threshold). Thus, conventional transceivers monitor certain parameters to generate a flag(s) that indicates when a parameter value is higher or lower than a predetermined operating value.

However, threshold values used for flag generation in conventional transceivers are static, and do not change with changes in environmental or operating conditions. Certain thresholds (e.g., predetermined allowable ranges and/or variances in bias current) may be acceptable for a given temperature or range of temperatures, but may not be acceptable for temperatures outside of the given temperature or range. For example, at room temperature, a transceiver may rely upon initial threshold values to accurately reflect allowable operating conditions at room temperature. However, when the temperature of the transceiver increases to a temperature significantly greater than room temperature, the initial threshold values may not accurately reflect ideal or allowable operating conditions at the increased temperature. That is, at the increased temperature, flags indicative of a hardware malfunction at room temperature may be generated (i.e., based on the initial temperature threshold values), even though the transceiver is safely operating at the increased temperature. Thus, conventional transceivers may have issues with obtaining and/or generating accurate operational information when environmental or operating conditions change.

Furthermore, variations in the operating parameters can show performance and reliability trends and potential faults in the hardware and/or software in the devices and networks. However, conventional optical and optoelectronic devices in optical networks have not had an easy way to track and/or report such variations.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

Embodiments of the present invention relate to methods, algorithms, architectures, circuits, software, and/or systems for monitoring variations in operational parameters in optical devices.

In exemplary embodiments of the present invention, an optical transceiver may include (i) an optical receiver configured to receive optical data; (ii) an optical transmitter configured to transmit optical data; (iii) one or more memories configured to store (1) data for at least one operational parameter of the transceiver, (2) at least one corresponding time interval during which the data were determined, and (3) one or more predetermined thresholds, each of the predetermined thresholds corresponding to an operational warning or alarm; and (iv) logic configured to (1) calculate a variation in at least one operating parameter as a function of time from the data and the time interval, (2) compare the variation to one or more predetermined thresholds, each threshold corresponding to an operational warning or alarm, and (3) generate the operational alarm or warning when the variation exceeds the corresponding threshold.

In other embodiments, the optical transceiver comprises one or more analog-to-digital converters (ADCs) coupled to the optical transmitter and the optical receiver, and the memory or memories comprise a register configured to store the data relating to the operational parameters from the ADCs. The memory or memories of optical transceiver may have n predetermined thresholds, where n is a positive integer that greater than or equal to 1 (e.g., 1, 2, or more). This invention further relates to an electronic device that includes such an optical transceiver.

In further embodiments, the optical transceiver may include an interface configured to (i) receive a request from an external device for at least one value the data, (ii) provide at least one value to the external device in response to the request, and (iii) provide alarm or warning.

In other exemplary embodiments of the present invention, a method of tracking variation(s) in one or more operating parameters in an electronic device may include (i) monitoring the operating parameter(s) of the electronic device over time to determine a plurality of parameter values for each of the operating parameters and at least one corresponding time interval over which the parameter values are determined, (ii) calculating the variation in each of the operating parameters as a function of time, (iii) comparing the variation in each of the operating parameters to one or more predetermined thresholds, each of the predetermined thresholds corresponding to an operational warning or alarm, and (iv) generating the operational warning or alarm when the variation exceeds the corresponding threshold. The optical transceiver may have n operational parameters, where n is a positive integer greater than or equal to 1 (e.g., 1, 2, or more). In further embodiments, generating the operational warning or alarm comprises crossing at least one predetermined threshold in a predetermined direction.

In various embodiments, the present method can further include setting one or more predetermined thresholds based on a permissible variation of a parameter value, and calculating a difference between at least two of the parameter values. In some embodiments, the method can include measuring a time difference between times at which the parameter values are taken. In various embodiments, the method can include storing the variation in each of the operating parameters in a predetermined location in a memory.

Embodiments of the present invention advantageously provide an approach for generating and/or calculating operational status warnings and/or alarms by tracking variations in the operating parameters. Embodiments of the present invention can advantageously provide accurate and/or timely operational control information for an optical transceiver. By utilizing the present invention, variations in operational parameter values (e.g., relative to control limits) can reflect changes in operational, functional, or environmental conditions relative to control limits and provide operational status indications based on such changes, and can reflect or forecast malfunctioning hardware, software, and/or network environments, and can even forecast an end of life (EOL) condition. Additionally, by tracking the variations in operating parameters (e.g., temperature, bias current, time, etc.) during operation, the present invention can more accurately identify a current malfunction or predict a future issue in a transceiver or network and provide valuable information to the user in comparison to conventional transceivers.

These and other advantages of the present invention will become readily apparent from the detailed description of various embodiments below.

BRIEF DESCRIPTION OF THE DRAWINGS

FIG. 5 is a flow diagram showing an exemplary method of generating statistical information and status indications in accordance with embodiments of the present invention.

DETAILED DESCRIPTION

Figure 1:
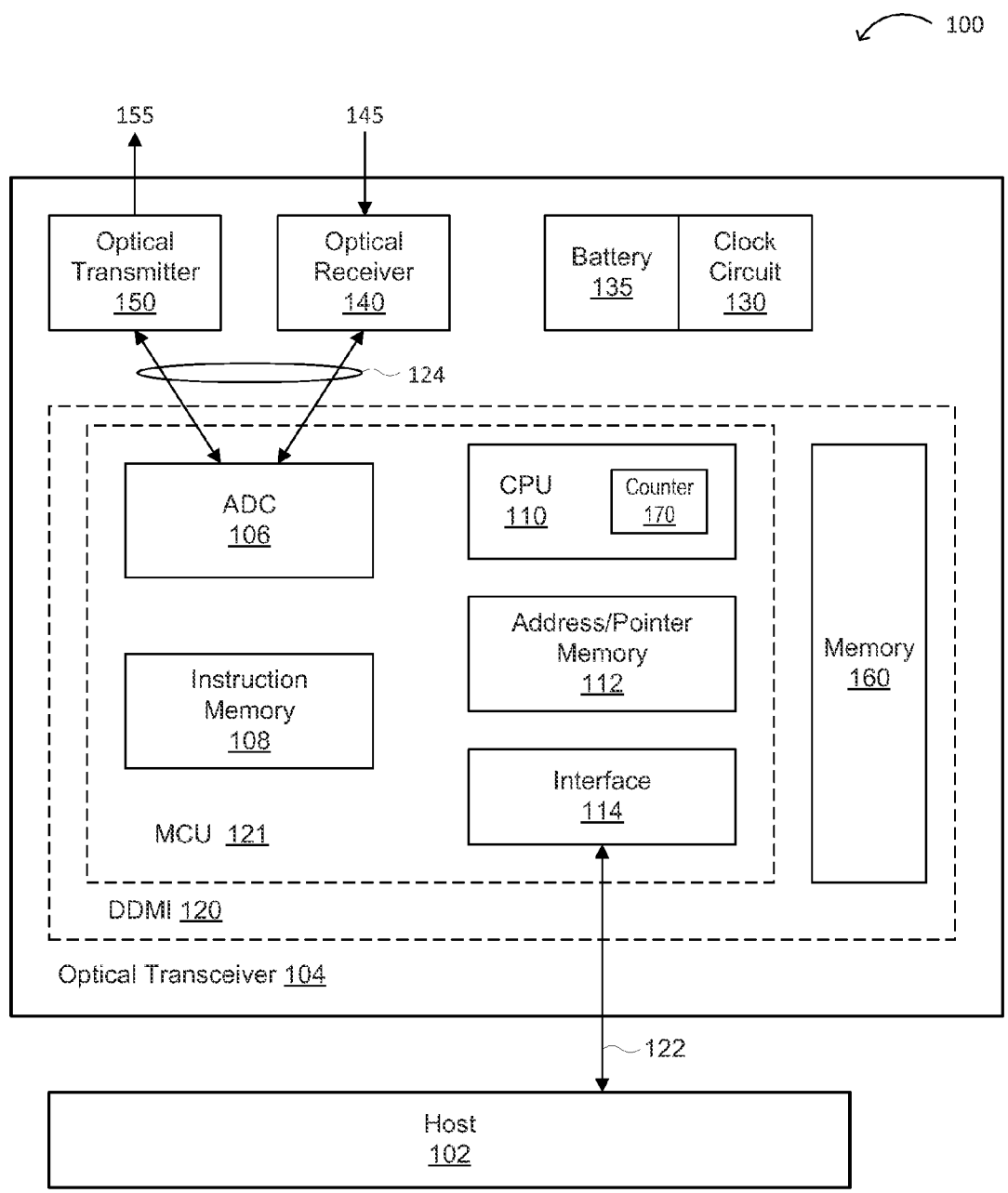
FIG. 1 is a block diagram showing an exemplary optical transceiver system in accordance with embodiments of the present invention.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the disclosure.

Some portions of the detailed descriptions which follow are presented in terms of processes, procedures, logic blocks, functional blocks, processing, and other symbolic representations of operations on code, data bits, or data streams within a computer, processor, controller and/or memory. These descriptions and representations are generally used by those skilled in the data processing arts to effectively convey the substance of their work to others skilled in the art. A process, procedure, logic block, function, process, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, streams, values, elements, symbols, characters, terms, numbers, or the like, and to their representations in computer programs or software as code (which may be object code, source code or binary code).

It should be borne in mind, however, that all of these and similar terms are associated with the appropriate physical quantities and/or signals, and are merely convenient labels applied to these quantities and/or signals. Unless specifically stated otherwise and/or as is apparent from the following discussions, it is appreciated that throughout the present application, discussions utilizing terms such as "operating," "calculating," "determining," or the like, refer to the action and processes of a computer or data processing system, or similar processing device (e.g., an electrical, optical, or quantum computing or processing device or circuit), that manipulates and transforms data represented as physical (e.g., electronic) quantities. The terms refer to actions and processes of the processing devices that manipulate or transform physical quantities within the component(s) of a circuit, system or architecture (e.g., registers, memories, other such information storage, transmission or display devices, etc.) into other data similarly represented as physical quantities within other components of the same or a different system or architecture.

Furthermore, in the context of this application, the terms "signal" and "bus" refer to any known structure, construction, arrangement, technique, method and/or process for physically transferring a signal from one point in a circuit to another. Also, unless indicated otherwise from the context of its use herein, the terms "designated," "fixed," "given," and "predetermined" generally refer to a value, quantity, parameter, constraint, condition, state, process, procedure, method, practice, or combination thereof that is, in theory, variable, but is typically set in advance and not varied thereafter when in use. Similarly, for convenience and simplicity, the terms "time," "rate," "period" and "frequency" are, in general, interchangeable and may be used interchangeably herein, but are generally given their art-recognized meanings. Also, for convenience and simplicity, the terms "data," "bits," and "information" may be used interchangeably, as may the terms "coupled to," and "in communication with" (which may refer to direct or indirect connections, couplings, or communications), but these terms are generally given their art-recognized meanings herein.

The invention, in its various aspects, will be explained in greater detail below with regard to exemplary embodiments.

An Exemplary Optical Transceiver

In one example, an optical transceiver capable of calculating variations in its operating parameters can include (i) an optical receiver configured to receive optical data; (ii) an optical transmitter configured to transmit optical data; (iii) one or more memories configured to store (1) data for at least one operational parameter of the transceiver, (2) at least one corresponding time interval during which the data were determined, and (3) one or more predetermined thresholds, each of the predetermined thresholds corresponding to an operational warning or alarm; and (iv) logic configured to (1) calculate a variation in at least one operating parameter as a function of time from the data and the time interval, (2) compare the variation to one or more of the predetermined thresholds, and (3) generate the operational alarm or warning when the variation exceeds the threshold.

For example, the variation may be useful for monitoring performance of an optical device with respect to control limits, which can help determine whether the device (or another component in the network) is operating properly and/or as expected. Further, the present invention can be useful for predicting and/or forecasting potential problems and/or issues with respect to the performance of the device and/or network, including potential EOL conditions for the device. For example, by tracking variations in the temperature of an optical transmitter (such as a laser diode), the present invention may indicate the cooling capacity of the optical device. If the temperature is continuously increasing or decreasing when the optical device is operated under conditions that should keep the temperature constant (i.e., the variation is consistently or constantly in one direction), an algorithm may calculate, and thus predict, a remaining number of times that the temperature of optical device will exceed the temperature threshold, and thus, reach the EOL of the device. In addition, some or all of the memory and logic may be included in a digital diagnostic monitoring interface (DDMI) in the device. In various embodiments of the present disclosure, the logic in the DDMI is configured to generate the alarm or warning when the variation crosses at least one of the predetermined thresholds in a predetermined direction. In addition, the logic may be configured to shut down the optical transceiver prior to or immediately after a particular variation exceeding the corresponding alarm threshold.

The DDMI may be configured to track and store data of one or more operational parameters, variations of or in the data, corresponding time intervals in which the variations occurred, and operational thresholds applicable to the variations (e.g., control limits in the case of parametric variations). The thresholds may include at least two members of the group consisting of a low warning threshold, a high warning threshold, a low alarm threshold, and a high alarm threshold. More specifically, each of the predetermined thresholds may be numerical variation from a target value. Alternatively, at least one of the thresholds may be a percentage difference from a target value.

It should be noted that in various embodiments of the present disclosure, the operating parameters may include one or more of a laser temperature, a module temperature, optical receiver temperature, a regulated voltage, a bias voltage, a common mode voltage, a bias current, a transmitted optical digital power, a received optical digital power, a received optical video power, a radio-frequency (RF) output power, a modulation amplitude, a modulation frequency, time, an amplifier gain, a channel spacing, a laser frequency, a laser wavelength, and statistical parameters for operating parameters such as average value, maximum value, minimum value, standard deviation, rate of change, and root-mean-square of a set of parametric values.

In further embodiments, the optical transceiver comprises one or more analog-to-digital converters (ADCs) coupled to the optical transmitter and/or the optical receiver, and the memory or memories comprise registers configured to store the data relating to the operational parameters from the ADCs, and one or more separate registers for storing corresponding time interval information and the variation information. Certain registers may be configured to store operational parameter data from a corresponding one of the ADCs.

In some embodiments, the optical transceiver may include an interface configured to (i) receive a request from an external device for at least one value of the operational parameter data, statistical data, and/or variation information, (ii) provide at least one value to the external device in response to the request, and (iii) provide the alarm or warning. In addition, the interface is configured to receive one or more alarm or warning thresholds from the external device.

One exemplary optical transceiver of the present disclosure is capable of calculating and/or predicting its EOL (end-of-life) using information relating to variations in the output optical power of the optical transceiver. In general, every optical device has an EOL, but the EOL of any given optical transceiver is usually unknown. According to exemplary embodiments of the present invention, the variation in output optical power may be used to calculate and/or determine the time remaining before the optical transceiver reaches its EOL. As a result, the optical transceiver or optical device may forecast and/or calculate its own EOL. Furthermore, a warning signal or notification may be provided or transmitted before the device and/or system reaches its EOL, preventing or minimizing the effect on data connections and/or system performance. Similarly, the variation in the received optical power (or the "receiver power") may be used to monitor remote optical devices.

Thus, exemplary embodiments of the present disclosure enable warnings, notifications, or alarm signals, before and/or immediately after a hardware or software malfunction, thereby avoiding a problem or decrease in system performance and/or a loss in data connection (e.g., due to device EOL). Additionally, by tracking and/or monitoring variation information that may change as a function of time, exemplary embodiments of the present invention can monitor and/or control operations of an optical transceiver more reliably, identify out-of-control parameters of the transceiver more quickly and/or accurately, and provide more accurate, valuable and/or useful end-of-life information to the user, in comparison to conventional transceivers.

FIG. 1 illustrates an exemplary system 100 and optical transceiver 104 in accordance with embodiments of the present invention. Optical transceiver 104 (e.g., a fiber-optic transceiver) can be coupled to a host 102 or other external device. Host 102 can be a host processor, circuit board, stand-alone optical network device (e.g., repeater, optical switch, set-top box, etc.) or any other component or device including a suitable controller or processor. Host 102 can interface with optical transceiver 104 via communications interface 122. Communications interface 122 can be a serial interface, and is configured to provide bidirectional communications between host 102 and fiber-optic transceiver 104 (e.g., via interface controller 114). Alternatively, communications interface 122 can be a parallel interface carrying a multi-bit signal.

Optical transceiver 104 can include a digital diagnostic monitoring interface (DDMI) 120, a microcontroller unit (MCU) 121, a clock circuit 130, a battery 135, an optical receiver 140, an optical transmitter 150, and memory 160. The DDMI 120 may include the MCU 121 and memory 160. For example, optical receiver 140 can be a photodiode or any other device configured to receive an optical signal 145 and convert the received optical signal into an electrical signal. Optical transmitter 150 can include a light-emitting diode (LED), laser diode, or any other suitable device for generating light pulses (e.g., optical signals) over an optical signal medium 155 (e.g., a fiber-optic link). Optical signals 155 and 145 may be transmitted over separate optical links, or may be part of a common fiber-optic link or any other suitable optical connection (e.g., optical waveguide, multi-mode fiber[s] [MMF], single-mode fiber[s] [SMF], etc.). In addition, an optical duplexer, an optical triplexer, or other multiple transceiver configurations can be formed by including two or more optical transmitters 150 and/or optical receivers 140 (e.g., two or more optoelectronic transmitters with a single optoelectronic receiver).

Analog electronic signals 124 are transmitted between analog-to-digital converter (ADC) 106 and optical transmitter 150, and between optical receiver 140 and ADC 106. Analog electronic signals 124 can accommodate optical signal information in an electronic form. ADC 106 can then convert these electronic signals from an analog form into a digital form to allow for digital processing within MCU 121. MCU 121 can further include interface controller 114, logic (e.g., a central processing unit [CPU] or microprocessor) 110, counter 170, and memory (e.g., instruction memory 108 and/or address and pointer memory 112). MCU 121 generally receives and transmits communications with host 102 over host communications interface 122. In alternative embodiments, ADC 106, instruction memory 108, and/or address and pointer memory 112 are separate units configured to electronically communicate with MCU 121 using separate individual interfaces.

Figure 2:
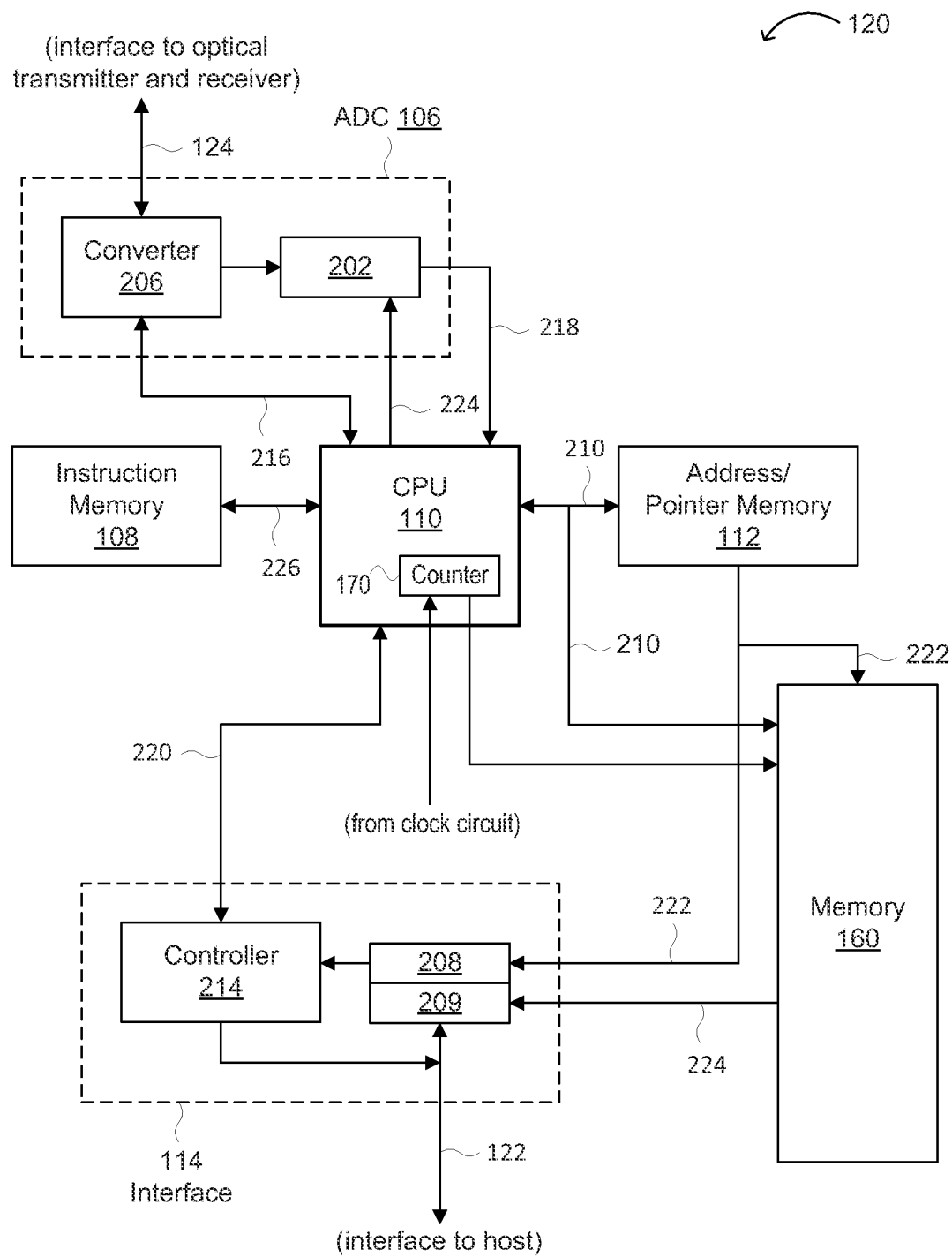
FIG. 2 is a block diagram showing exemplary hardware for an optical transceiver in accordance with embodiments of the present invention.

In certain embodiments, memory 108 includes non-volatile memory (e.g., instruction memory 108) and volatile memory (e.g., address and pointer memory 112 [see FIG. 2]). Generally, thresholds, operational parameter data, statistical data, variation information/data, and time information are stored in volatile memory. In some applications, instructions can be stored in the volatile memory (e.g., RAM) or other high-speed memory for performance reasons. Further, various data (e.g., configuration data and/or initial thresholds) can be stored in ROM or other non-volatile memory for efficiency reasons, such as when the stored data does not change or changes relatively infrequently. Examples of non-volatile memories include electrically erasable programmable read-only memory (EEPROM), flash EEPROM, magnetoresistive RAM (MRAM), laser programmable memories (e.g., fuse-based), or any other suitable type of ROM or non-volatile storage. Examples of volatile memories include static random-access memory (SRAM), dynamic RAM (DRAM), or any other suitable type of RAM or volatile storage element that maintains a stored state when power is applied and that can be rewritten without application of special voltages or use of special procedures (e.g., conventional non-volatile memory write and/or erase procedures).

Clock circuit 130 can provide a clock signal to optical transceiver 104 when the optical transceiver receives power form an external power source and is powered "ON," or continuously (e.g., without an external power source). In such an embodiment, clock circuit 130 is electrically connected to battery 135, which provides power when the external power source is not received (e.g., when the optical transceiver temporarily loses power as a result of a fault or power outage). Clock circuit 130 generally has a frequency of from about 10 kHz to 300 MHz (e.g., 32.7 kHz, 3.57 MHz, 4.43 MHz, 10 MHz, 14.3 MHz, or any value sufficient to enable functional and stable operation of counter 170). Counter 170 can receive the clock signal and count the number of cycles of the signal that results in a predetermined period of time (e.g., 1 second, 10 seconds, 1 minute, etc.) elapsing. Additionally, by utilizing battery 135, an external power source is not required, and the date of manufacture can be recorded (e.g., stored in memory 160) and the working age of optical transceiver 104 can be continuously updated (e.g., utilizing clock circuit 130 in conjunction with memory 160).

As discussed below in greater detail with respect to FIGS. 2 and 3, memory 160 maintains parametric data, statistics information, thresholds, error checking code (optionally), percentage variance(s), percentage difference(s), operational statuses, and latched thresholds. A detailed description of the use of percentage variances and percentage differences in determining operational statuses may be found in U.S. patent application Ser. Nos. 13/371,313 and 13/427,691, filed Feb. 20, 2012 and Mar. 22, 2012, the relevant portions of which are incorporated by reference herein. The statistics information can be provided to host 102 via communications interface 122.

An Exemplary Microcontroller for an Optical Transceiver

FIG. 2 illustrates an exemplary microcontroller 121 for an optical transceiver (e.g., optical transceiver 104 in FIG. 1) in accordance with embodiments of the present invention. ADC 106 can interface with an optical transmitter and an optical receiver (e.g., optical receiver 140 and optical transmitter 150 in FIG. 1) via optical information signals 124. In some embodiments, ADC 106 is used to monitor a first operating parameter (e.g., parametric data related to operation(s) of optical transmitter 150 and/or optical receiver 140), and a second ADC (not shown) is used to monitor a second operating parameter different from the first operating parameter. In further embodiments, the present exemplary microcontroller 121 may comprise up to N ADCs configured to monitor N operating parameters, where N is any positive integer greater than zero (e.g., 2, 3, 5, 10, etc.). The different ADCs can operate at the same rate or at different rates. CPU 110 may utilize control signal 216 for interacting with ADC 106 via converter 206. Register 202 can contain an output for ADC 106 by capturing output data from converter 206. In some cases, a demultiplexer (not shown) or a bank of registers may be used in addition to, or in place of, register 202 in order to support a higher rate of data output from converter 206. For example, data can be output from converter 206 into a bank of registers in a sequential or round-robin fashion. In the example of a demultiplexer, data output from converter 206 may be sent via the various demultiplexer outputs to CPU 110 or to a register bank elsewhere in the optional transceiver.

For example, register 202 can include parametric data, variation information/data, and statistical data related to operation(s) of optical transmitter 116 and/or optical receiver 118 (see, e.g., FIG. 1). As discussed above, register 202, while shown in FIG. 2 as a single register, can also be implemented as a bank of registers, or an otherwise larger memory portion for capturing larger amounts of data from ADC 106. For example, various parametric data can be captured in a serial fashion or in parallel. As a result, although the output of converter 206 is generally multi-bit (e.g., n bits wide, where n is an integer of at least 2, such as 4, 6, 8, 10, 12, 16, 32, etc.), the data output by register 202 may be serial or parallel. In order for CPU 110 to retrieve this parametric data, data access control signal 224 can be activated by CPU 110. In response to control signal 224, data from register 202 can be output via ADC output signal/bus 218.

Parametric data (e.g., related to operation(s) of optical transmitter 116 and/or optical receiver 118) can be supplied to ADC output register 202 and/or accessed by CPU 110 (via ADC output signal/bus 218) at a predetermined frequency and/or on-demand. For example, converter 206 can periodically update register 202 during normal operation of ADC 106 and/or CPU 110. When data access control signal 224 is held in an active state, CPU 110 can receive the periodically updated data from register 202 via ADC output signal 218 at the same frequency that the parametric data is supplied to ADC output register 202 (e.g., from the optical transmitter 116 and/or optical receiver 118). For example, this parametric update rate can vary from about 1 ms to about 100 ms (e.g., about 50 ms), or at any other update rate within this range or outside this range, depending on the operating frequencies of ADC 106 and CPU 110 and the design of register 202 (e.g., whether it is or is part of a bank of registers, whether it includes a demultiplexer, etc.). Certain embodiments may also support a plurality of parametric data update rates (e.g., different update rates for different parameters), including variable update rates for one or more of the parameters for which data are periodically updated. For example, clock circuit 130 can provide a clock signal to CPU 110 such that CPU 110 updates the parametric data at predetermined intervals. Counter 170, on the other hand, maintains a count associated with the clock signal such that lengths of time associated with the predetermined intervals (e.g., a second, a minute, an hour, a day, a week, a month, etc.) can be determined. The times at which some or all of the parametric data are sampled by ADC 106 and/or stored in memory 160 can also be stored in memory 160.

Similarly, CPU 110 can retrieve parametric data from memory 160 and perform calculations thereon to determine variations in the data. CPU 110 can perform such calculations periodically, on demand, and/or as available bandwidth permits. Variation data/information (e.g., calculated variations) are stored in memory 160 by CPU 110.

In some applications, the variation calculation rate and/or parametric data update rate can be programmed by the manufacturer or a user. For example, the manufacturer can program the data update and variation calculation rates appropriately and/or empirically for each parameter and variation being monitored. For example, bias current and laser temperature may be updated relatively frequently (e.g., 1 update per 1-10 microseconds), but voltages or time may be updated relatively less frequently (e.g., 1 update per minute, hour, or day). Variations in laser temperature may be calculated frequently (e.g., every 10-100 μs), but variations in voltages may be calculated less frequently (e.g., once per hour, day, or week). Alternatively, a variety of supported update rates can be presented to the user for selection via a graphical user interface (GUI). Also, while a given parametric data update and/or variation calculation rate can be selected or otherwise fixed, parametric data can also be updated and variation calculated upon demand, such as in response to a request from host 102. In some cases, an option (e.g., a user-controlled option) can be employed whereby some or all of the parametric data and variations are designated to be determined periodically, or only upon demand. In other cases, on-demand parametric data updating and variation calculation can essentially act as an override or supplement to an otherwise periodic update/calculation mode. Thus, parametric data can be updated via register 202 and ADC output signal 218, and calculated variations stored by transmission on signal 210, periodically and/or upon demand, and these update/calculation modes may depend on particular applications, certain parameters, as well as manufacturer and/or user configurations.

CPU 110 can retrieve (e.g., fetch and/or pre-fetch) instructions from instruction memory 108 via interface signals 226. CPU 110 can also interface with address and pointer memory 112 via bus(es) 210. Address and pointer memory 112 can be a smaller and faster memory (e.g., have a smaller capacity/density and be configured to operate at a higher frequency) relative to the memory 160. In one embodiment, address and pointer memory 112 comprises a cache memory, which can also store other information as desired. For example, address and pointer memory 112 may store copies of certain parametric data, variations, and associated thresholds that are most likely to be requested by CPU 110 for operational status and/or control determination. In the particular exemplary arrangement shown in FIG. 2, address and pointer memory 112 can provide output signal 222 to interface controller 114. Parametric data received from ADC output 218 can be provided on bus(es) 210 to memory 160 for storage. Additionally, address and pointer memory 112 can provide an address/pointer signal 222 to memory 160, which then provides the requested data (i.e., at the address or location identified by the address/pointer signal 222) to interface controller 114 on bus 224. Memory 160 can include a plurality of registers or other volatile memory that can be allocated for storage of parametric data, variation information, time data, statistical information, target values, threshold values, error checking code, comparison results, etc. Further, memory 160 can be subdivided into any number of blocks or other arrangements (e.g., different pages of memory or even different memory integrated circuits [ICs]).

In one embodiment, a user may store a predetermined number of parameters and/or thresholds in address and pointer memory 112 such that an associated operational status indication (e.g., an operational alarm or warning) or associated variation information can be provided to host 102 in less processing time than methods not utilizing address and pointer memory 112. A "warning" status indication may indicate an operable system, but in which the system does not ensure or guarantee continued operability. An "alarm" status indication may represent a possible imminent shutdown of the system. Thus, the status indications may indicate that the system is at risk of faulty operation or shutdown due at least in part to the associated operational parametric data crossing the designated threshold in a predetermined direction. For example, the status indications may be represented by indicators such as or corresponding to "NORMAL," "OVER LIMIT," "UNDER LIMIT," "WARNING," "ALARM," and high and low variations of the warning and alarm indications (e.g., "LOW WARNING," "HIGH ALARM," etc.). Parametric data, variation information, and associated thresholds can be stored in address and pointer memory 112 based on factors such as elapsed writing time (e.g., parametric data, thresholds, and/or variation information that are most recently written to or stored in memory 160), or elapsed request time (e.g., parametric data, thresholds, and/or variation information that was most recently requested by host 102). In this fashion, address and pointer memory 112 may effectively be used to decrease the read time of certain operational status indication and/or variation information to service a request from host 102.

Each of buses 210 and 222 may independently be a serial bus or multi-bit bus, and bus 210 may support unidirectional or bidirectional signaling. Memory 160 receives a counted clock signal from counter 170. The counted clock signal may include real-time clock information (e.g., seconds, minutes, hours, etc.), which can control operations of memory 160 and be stored in memory 160 (e.g., for variation calculations). CPU 110 also receives a clock signal from clock circuit 130.

Clock circuit 130 may be powered by battery 135 (e.g., when an external power source is not provided). CPU 110 can also send control signals on bus(es) 210 to control accesses to parametric data, thresholds, and optionally, error checking code (ECC) from memory 160 in order to calculate and/or determine operational status indications and variation information therefrom. Such accessing of parametric data and thresholds from memory 160 may be performed periodically and/or in response to on-demand requests, such as requests from host 102 (e.g., to obtain an operational status and/or modify or set one or more thresholds). For example, memory 160 can be accessed by CPU 110 and provide parametric data, variation information and thresholds at substantially the same rate that ADC output signal 218 is updated, or at a higher or lower rate.

In certain embodiments, MCU 121 of FIG. 1 maintains parametric data, thresholds, percentage variance(s), percentage difference(s), threshold comparison results (operational statuses), latched thresholds, and optionally, error checking code, in memory (e.g., memory 160).

A request for a status indication or status information (e.g., normal operating status, or an alarm or warning) and/or variation information can be received by interface controller 114 via host communications interface 122. The operational status and/or variation information request (e.g., from host 102) can include an identifier for the requested threshold and/or variation information register. Register 208 can store the incoming threshold and/or variation information register identifier, as well as associated outgoing threshold and/or variation information. Alternatively, separate registers can be used to store incoming identifier information and outgoing threshold and/or variation information. Controller 214 can send the request to CPU 110 using command signal(s) 220. CPU 110 may then correlate or map the identifier from the status indication and/or variation information request to one or more particular memory locations in memory 160, at which the corresponding parametric data, variation information and/or associated thresholds are located. For example, CPU 110 may maintain a table (e.g., address and pointer memory 112) that maps the threshold and/or variation information register identifier(s) from the status indication and/or variation information request(s) to the appropriate storage location(s) in memory 160 (e.g., threshold registers 312 and variation registers 350 in FIG. 3) so that CPU 110 can retrieve corresponding parametric data, variation information, and/or thresholds for calculation of the requested status indication (see, e.g., U.S. patent application Ser. No. 13/070,358 filed Mar. 23, 2011, U.S. patent application Ser. No. 13/075,092, filed Mar. 29, 2011, U.S. patent application Ser. No. 13/348, 599, filed Jan. 11, 2012, U.S. patent application Ser. No. 13/371,313 filed Feb. 20, 2012, and U.S. patent application Ser. No. 13/427,691 filed Mar. 22, 2012, the relevant portions of which are included herein by reference). The table may comprise a bank of pointer registers (e.g., in address and pointer memory 112) that is accessed when the status indication and/or variation information request(s) is received via command signal(s) 220.

Once CPU 110 receives the operational status and/or variation information request(s) via command signal/bus(es) 220, CPU 110 can send a memory read request to memory 160 via signal 210. Once the request, command, or a version or derivative thereof (e.g., an operational status and/or variation information identifier) received on host communications interface 122 is sent to CPU 110 via command signal 220, CPU 110 can issue a read command via bus(es) 210 to memory 160 and address and pointer memory 112. As part of this process, CPU 110 can effectively translate information received from host 102 as part of the operational status and/or variation information request(s) into actual memory locations that store the parametric data, variation information and/or associated thresholds to be accessed in order to calculate the requested status indication and/or variation information. The operational status and/or variation information can then be sent from the memory 160 via memory output signal 224 (or from address and pointer memory 112) via memory output signal 222. Alternatively, the operational status indication and/or variation information may be sent from CPU 110 to interface controller 114. In any event, interface control register 208 can receive the operational status indication and/or variation information, which may then be provided to host 102 via host communications interface 122. As discussed above, interface control register 208 may also be used to store the incoming status identification and/or variation information. In this case, register 208 may be wide enough (e.g., 32 bits wide, 64 bits wide, 128 bits wide, etc.) to accommodate such incoming request information and outgoing status and/or variation information. Alternatively, separate registers (e.g., registers 208 and 209, each having a width of 16 bits, 32 bits, 64 bits, etc.) can be used to store incoming information requests and outgoing status indication and/or variation information data. Further, various registers and storage locations discussed herein may also be grouped together in the same memory block or other similar storage structure.

Acceptable threshold register sizes (e.g., 8 bits wide, 16 bits wide, 32 bits wide, etc.), depending on CPU architecture, operating system, as well as other design considerations (e.g., the number of bits of resolution of the parametric data), etc., can be determined for each particular embodiment utilized. In certain embodiments, acceptable variation information register formats (e.g., bit maps, unsigned/signed integers, IEEE floating point, etc.) can also be supported. Furthermore, any suitable capacity (e.g., at least 2 kB, several kB, 16 kB, or higher) of memory 160 can be supported in particular embodiments. Also, any suitable memory technologies or types of memories (e.g., flash memory, serial EEPROM, SRAM, DRAM, etc.) can be supported in particular embodiments. In addition, as discussed above, address and pointer memory 112 can represent a smaller and faster memory relative to memory 160. Various registers and/or allocated memory portions can be found or replicated within address and pointer memory 112 to support faster accesses to parametric data, variation information, thresholds, and/or status indications that may be stored therein.

Figure 3:
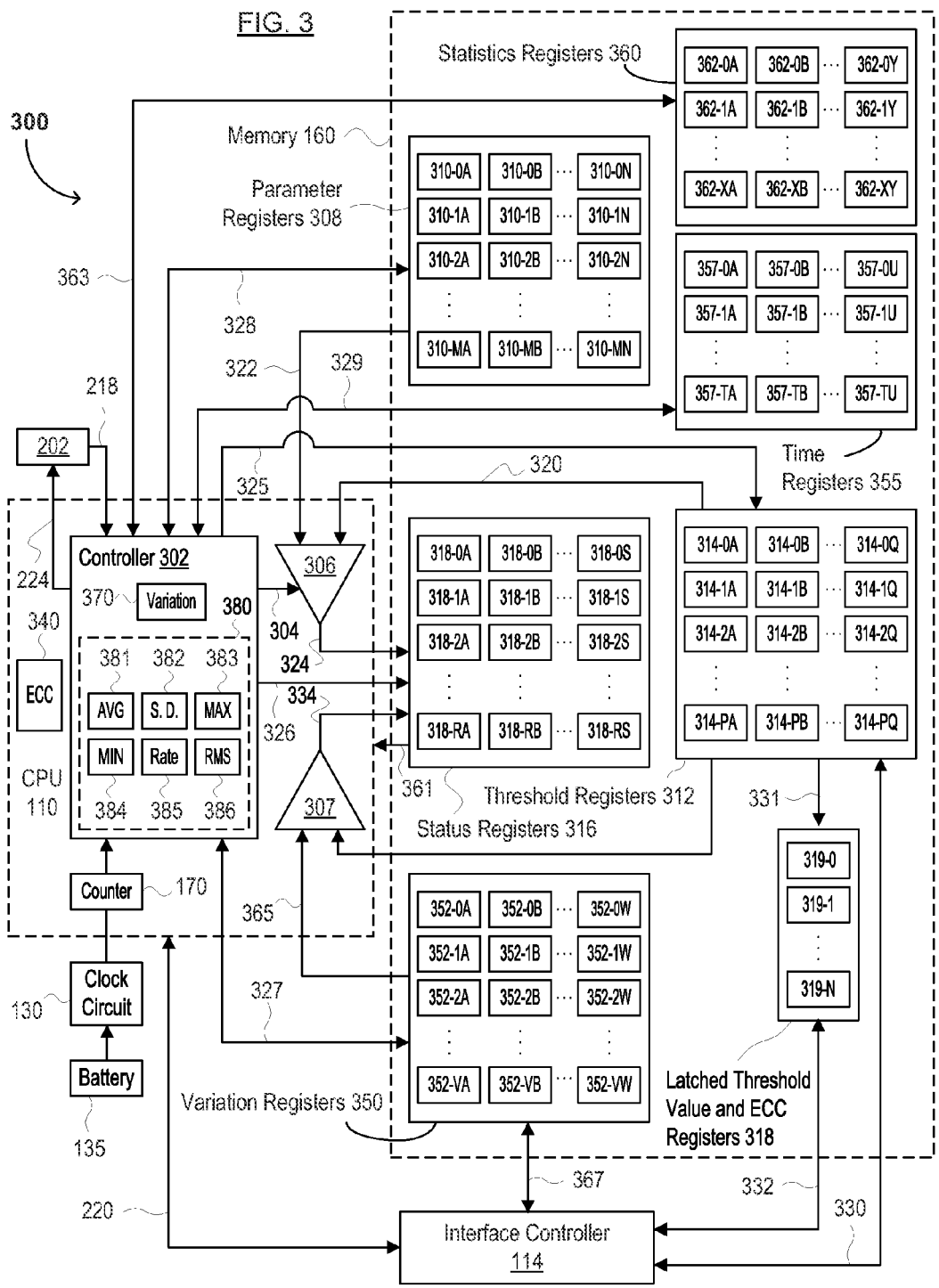
FIG. 3 is a block diagram showing an exemplary data storage/manipulation and memory control structure in accordance with embodiments of the present invention.

FIG. 3 illustrates an exemplary variation calculation and memory control structure 300 in accordance with embodiments of the present disclosure. The present control structure 300 advantageously dynamically calculates the DDM variation rate in the module, triggering an alarm (e.g., low alarm, low warning, high alarm, or high warning). In addition, the present control structure 300 may automatically shut down the module to prevent or minimize damage to the module during incorrect operation or usage. Furthermore, the present control structure 300 can be utilized to calculate and store variation information on monitored parameter values, as well as generate status indications (e.g., alarms and warnings) based on the monitored parameter values and variation information. In some embodiments, control structure 300 may calculate variation information as a function of time (e.g., using a clock circuit and a counter). Control structure 300 can provide more accurate information regarding trends in optical transceiver operation, monitor various transceiver and/or network parameter and control thereof, predict an impending transceiver failure and/or EOL of the device, and be used as a type of "black box" to enhance failure analysis by providing details of the optical transceiver and/or network just prior to failure.

As shown, statistics generation and status indication control structure 300 may comprise a clock circuit 130, battery 135 (optional), CPU 110, ADC register 202 within ADC 106 (not shown), interface controller 114, and memory 160. As discussed above, ADC output register 202 may be implemented as a bank of registers instead of one register, and operating parameter registers 308 may form this bank of registers as a replacement for, or in addition to, ADC output register 202. Memory 160 comprises parameter registers 308, threshold registers 312, status registers 316, latched threshold and ECC registers 318, variation registers 350, time registers 355, and statistics registers 360, each of which is discussed below in greater detail. Additionally, CPU 110 comprises error checking code (ECC) block 340, counter 170, comparators 306 and 307, and a controller 302, itself comprising a variation calculator block 370 and statistics logic 380.

Referring to FIG. 3, variation registers 350 are configured to store variation values in operational parameters during a specific or predetermined time interval that are calculated by variation block 370. The variation registers 350 communicate with the controller 302 via bus 327. The variation values may be stored as numerical values or percentages. As shown, variation registers 350 comprise a first block of variation registers 352-0A, 352-0B, . . . 352-0W, a second block of variation registers 352-1A, 352-1B, . . . 352-1U, up to an Wth block of variation registers 352-VA, 352-VB, . . . 352-VW, where W+1 is the number of operating and/or statistical parameters for which variation and/or status information is monitored or requested, and W (or in some cases, W−1) is the number of time interval values to be applied to the various parameters and W may independently be any positive integer.

For example, register 352-0A can be used to store a first variation value for a first operating parameter over predetermined time interval, register 352-0B can be used to store a second variation value for the first operating parameter over the same time interval, etc. Such variation values can include absolute variations for the parameter values, or percentage differences. Furthermore, a variation register 352-2A may store a first variation value for a second operating parameter over a second (e.g., longer) time interval, a variation register 352-2B may store a second variation value for the second operating parameter over the second time interval, a variation register 352-2C may store a third variation value for the second operating parameter over the second time interval, etc., and a variation register 352-2D may store a minimum variation value for the predetermined operating parameter, etc.

For example, register 352-0A can be used to store a variation value relating to a high warning status indication for a first operating parameter, register 352-0B can be used to store a variation value relating to a high alarm status indication for the first operating parameter, etc. Such variation values can include absolute variation for the parameter values, such as high and low thresholds, warning and alarm variation, high and low warning and alarm variation values. More specifically, a variation register 352-2A may store a first average variation for a predetermined operating parameter, a variation register 352-2B may store a second average value variation value for the predetermined operating parameter, a variation register 352-2C may store a maximum variation value for the predetermined operating parameter, a variation register 352-2D may store a minimum variation value for the predetermined operating parameter, etc.

The variation thresholds can be from a target or ideal value (e.g., 85° C.), or they can simply be relative to one or more end points of a suitable range (e.g., 70-110° C.). The variation from a target or ideal value can be an absolute number (e.g., +5° C. from the target or ideal value, −10 mA from the target or ideal value, etc.), or it can be a percentage (e.g., 15-30% of the target or ideal value, etc.). The amount or percentage can be the same in each direction, or different (e.g., +50 mV or −500 mV from the target value).

Different thresholds may exist for different time periods. Thresholds (variation limits) may be supplied from the host or other external device, or calculated by the on-board CPU. A description of such threshold determination may be found in U.S. patent application Ser. No. 13/371,313 filed Feb. 10, 2012, the relevant portions of which are incorporated by reference herein.

Additionally, when new parametric data is obtained for a given subgroup of parameter registers, variation calculator 370 can determine a variation of the parametric data, and variation information for the new parametric data can be stored in variation register 350. Thus, memory resources can be conserved. Examples of techniques for conservation of memory resources may be found in U.S. patent application Ser. No. 13/371,313 filed Feb. 10, 2012, the relevant portions of which are incorporated by reference herein.

Time registers 355 are configured to store times or time intervals to determine change or variation in operational parameters during a specific or predetermined time interval. The time registers 355 communicate with the controller 302 via bus 329. The times may be stored as numerical values, as time intervals may be stored as calculated differences. As shown, time registers 355 comprise a first block of time registers 357-0A, 357-0B, . . . 357-0U, a second block of threshold registers 357-1A, 357-1B, . . . 357-1U, up to a Tth block of threshold registers 357-TA, 357-TB, . . . 357-TU, where T+1 is the number of operating and/or statistical parameters for which status information is monitored or requested, and U is the number of time or time interval values to be applied to the various variation calculations. T may be zero or any positive integer, and U may be any positive integer.

For example, register 357-0A can be used to store a first time interval value relating to variation calculations in a first operating parameter, register 357-0B can be used to store a second time interval value relating to the variation calculation in the first operating parameter, etc. Such calculations can include different time intervals for the parameter variations, such one minute, one day, one hour, etc. Alternatively, a time register 357-2A may store a first time value for a first value of an operating parameter, a time register 357-2B may store a second time value for a second value of the operating parameter, a time register 357-2C may store a third time interval for a third value of the predetermined operating parameter, etc.

The variation calculator block 370 may comprise (1) a subtractor that subtracts two successive sampled values of a parameter and (2) a divider that divides the difference from the subtractor by the length of time elapsed between the samples. Alternatively, the subtractor may determine the difference between a maximum and a minimum for a particular parameter (e.g., as calculated or detected by MAX block 383 and MIN block 384), and the divider can divide that difference over the corresponding time interval for sampling the maximum and minimum values of that particular parameter (e.g., an hour, a day, a week, etc.). The timer can be counter-based, and can track elapsed time intervals in absolute values (e.g., in year:month:day:hour:minute:second) or as a difference (e.g., the timer starts when the first sample is taken, and stops when the next and/or last sample is taken).

In one embodiment, memory 160 comprises parameter registers 308, which store values of the monitored parameter(s) received from ADC 106. Statistics generation and status indication controller 302 in CPU 110 can activate signal 224 to read the parametric data contents of ADC output register 202 on ADC output signal/bus 218. Statistics generation and status indication controller 302 can then write the accessed parametric data relating to optical transceiver operation into parameter registers 308 via bus 328. Parameter registers 308 may include a first block (or bank) of parameter registers 310-0A, 310-0B, 310-0C (not shown), . . . 310-0N, a second block of parameter registers 310-1A, 310-1B, 310-1C (not shown), . . . 310-1N, a third block of parameter registers 310-2A, 310-2B, 310-2C (not shown), . . . 310-1N, . . . and so on through an Mth block of parameter registers 310-MA, 310-MB, 310-MC (not shown), . . . 310-MN, where M+1 is a number of monitored operating parameters and N is a number of samples and/or time periods over which the M+1 operating parameters are monitored. M may be zero or any positive integer, and N may be any integer of at least two. For example, N may correspond to four predetermined time periods and/or samples (i.e., N=4), in which case the samples may be taken at 250 millisecond time periods; N may be equal to six, in which case the samples may be taken at 10 second time periods; N may be equal to ten, in which case the samples may be taken at 6 minute time periods; N may be equal to 24, in which case the samples may be taken at 1 hour time periods, etc.

In one embodiment, register 310-0A may be used to store a most recent parameter value for a first monitored parameter, register 310-0B may be used to store a second most recent parameter value for the first monitored parameter, register 310-0C may be used to store a third most recent parameter value for the first monitored parameter, etc. In some embodiments, controller 302 can identify and/or select one or more subgroups of registers in each group of registers (e.g., a first subgroup formed by registers 310-1A through 310-1D [not shown], and a second subgroup formed by registers 310-1E [not shown] through 310-1H [not shown], etc.), for storage of parametric data at different rates, as discussed below in greater detail.

Threshold registers 312 are configured to store thresholds used to determine whether a particular operating parameter in parameter registers 308 or a statistical parameter value in statistics registers 360 crosses at least one corresponding threshold (e.g., in a predetermined direction). The thresholds may be stored as numerical values or as percentages (e.g., as percentage differences between an initial or predetermined target value; see, e.g., U.S. patent application Ser. No. 13/371,313, filed Feb. 20, 2012, the relevant portions of which are incorporated by reference herein). As shown, threshold registers 312 comprise a first block of threshold registers 314-0A, 314-0B, . . . 314-0Q, a second block of threshold registers 314-1A, 314-1B, . . . 314-1Q, a third block of threshold registers 314-2A, 314-2B, . . . 314-2Q, up to an Pth block of threshold registers 314-PA, 314-PB, . . . 314-PQ, where P+1 is the number of operating and/or statistical parameters for which status information is monitored or requested, and Q is the number of threshold values to be applied to the various parameters. P may be zero or any positive integer, and Q may be any positive integer.

For example, register 314-0A can be used to store a threshold value relating to a high warning status indication for a first operating parameter, register 314-0B can be used to store a threshold value relating to a high alarm status indication for the first operating parameter, etc. Such thresholds can include absolute thresholds for the parameter values, such as high and low thresholds (e.g., for an operating voltage or supply voltage), warning and alarm thresholds (e.g., for a laser temperature, optical receiver temperature, etc.), high and low warning and alarm thresholds, and statistics thresholds. The statistics thresholds may include one or more average value thresholds (e.g., high and low thresholds), one or more maximum value thresholds, and/or a minimum value thresholds (e.g., one or more warning and/or alarm thresholds for a parameter exceeding a maximum threshold or going below a minimum threshold), one or more RMS value thresholds, maximum and minimum rate thresholds, etc. More specifically, a threshold register 314-2A may store a first average value threshold for a predetermined operating parameter, a threshold register 314-2B may store a second average value threshold for the predetermined operating parameter, a threshold register 314-2C may store a maximum value threshold for the predetermined operating parameter, a threshold register 314-2D may store a minimum value threshold for the predetermined operating parameter, etc.

Furthermore, in alternate embodiments, the variation thresholds may include threshold values for a particular variation (e.g., a variation calculated on a block or subgroup of the parametric data in parametric registers 308) over a predetermined period of time, such as a one second, one minute, one hour, one day, one week, etc. For example, threshold register 314-2E may store a second variation threshold for a particular operating parameter during a first predetermined time period (e.g., a one minute time period), threshold register 314-2F may store a variation threshold for the operating parameter during a second predetermined time period (e.g., a greater variation during a one hour time period), and threshold register 314-2G may store a third threshold for the operating parameter allowing even greater variations during a third predetermined time period (e.g., a one day time period), etc.

The thresholds can be pre-programmed (e.g., using "default" values provided by a user via host 102 by way of interface controller 114 on bus 330), overwritten (e.g., by host 102), or automatically rewritten depending on a value of a second parameter (e.g., via controller 302 on bus 320). A description of changing thresholds based upon the status or value of a second parameter may be found in U.S. patent application Ser. No. 13/371,313, filed Feb. 10, 2012, the relevant portions of which are incorporated by reference herein.

At least one of the latched dynamic threshold and ECC registers 317 (e.g., registers 319-0, 319-1, . . . 319-N) stores the same threshold(s) as that stored in a corresponding threshold register 312, with ECC added thereto. For example, an ECC can be calculated on the threshold data (e.g., by ECC block 340 in CPU 110), appended to the threshold, and the combined threshold and ECC can be stored in threshold register 312 (e.g., register 314-0A). Alternatively, ECC block 340 can perform an error checking calculation (e.g., a checksum, a parity determination, a cyclic redundancy check [CRC], etc.) on the threshold stored in register 312 to generate the error checking code, which is appended onto the threshold and then stored in threshold and ECC registers 317. In some embodiments, a "memory lock" request can be provided to controller 302 (e.g., via interface controller 114 on bus 332) such that the contents stored in registers 317 is locked or latched. In response to the request, some or all of the thresholds and corresponding ECCs in threshold registers 312 are copied to and/or latched in latched threshold and ECC registers 317 (e.g., by controller 302 via bus 331), and the threshold registers 312 are then "locked" (i.e., not enabled for write operations). After the "memory lock" request is removed (e.g., by providing a "memory unlock" request to controller 302), the threshold registers 312 may be overwritten with new threshold values. Thus, the ECC stored in registers 312 and/or registers 317 can be used to check or confirm that the corresponding threshold value is correct. A description of latched dynamic threshold and ECC registers 317 may be found in U.S. patent application Ser. No. 13/371,313, filed Feb. 10, 2012, the relevant portions of which are incorporated by reference herein.

Status registers 316 comprise a first block of status registers 318-0A, 318-0B, . . . 318-0S, a second block of status registers 318-1A, 318-1B, . . . 318-1S, a third block of status registers 318-2A, 318-2B, . . . 318-2S, . . . up to an Rth block of status registers 318-RA, 318-RB, . . . 318-RS, where R+1 is the number of monitored operating and/or statistical parameters for which status information is monitored or requested, and S is a number of states and/or flags to be stored for the R+1 operating parameters. R may be zero or any positive integer, and S can be any positive integer. Status registers 316 can be configured to store a result of a comparison (e.g., of a parameter value in parameter registers 308 with corresponding thresholds in threshold registers 312 by comparator 306 received on bus 324) or a statistical value in statistics registers 360 with a corresponding threshold in threshold registers 324 received on bus 334.

For example, a first status indication register 318-0A may store a result of a comparison between (i) a parameter value stored in parameter register 310-0A and (ii) a corresponding set of thresholds stored in threshold registers 314-0A through 314-0Q (or a subset thereof, such as registers 314-0A through 314-0D). Similarly, a second status indication register 318-0B may store a result of a comparison between (i) a parameter value stored in parameter register 310-0B and (ii) a corresponding set of thresholds stored in threshold registers 314-0A through 314-0Q (or subset thereof). Alternatively, status indication register 318-0B can store a result of a different comparison between parameter register 310-0A and a different subset of thresholds (e.g., threshold values stored in threshold registers 310-0E and 310-0F). Similarly, a status indication register storing status indications for a statistical parameter (e.g., an average temperature) may store a result of a comparison between (i) an average temperature value stored in one of statistics registers 360, and (ii) a corresponding subset of threshold values stored in a subset of threshold registers (e.g., registers 318-PA though 318-PQ).

More specifically, to determine a status indication, statistics generation and status indication controller 302 can instruct memory 160 to output parametric data from one of the parameter registers 308 on bus 322 and corresponding thresholds from threshold registers 312 on bus 320, automatically or based on a (register) identifier (e.g., from address and pointer memory 112 or a status request received through interface controller 114). Comparator 306 may receive an enable signal (e.g., via bus 304) and compare the parametric data against the corresponding thresholds (e.g., one at a time or in parallel, using parallel comparators) to determine a status indication (e.g., a state or a series of flags) at comparator output 324 that indicates the relative magnitude of the parametric data versus the thresholds. Comparator 306 (and comparator 307, discussed below) may comprise a digital comparator, a magnitude comparator, or a plurality of such comparators that receives two or more numbers (e.g., parametric data for the operating parameter value and one or more corresponding threshold values) as inputs in binary form (e.g., bit strings) and determines whether the parametric value is greater than, less than, or equal to the threshold value(s).

Thus, comparator 306 may compare a percentage variance (e.g., from a target parameter value) to a percentage difference (e.g., representing a particular threshold; see, e.g., U.S. patent application Ser. No. 13/371,313, filed Feb. 10, 2012, the relevant portions of which are incorporated by reference herein). A result of the comparison can be used to generate an alarm or warning status indication. In some embodiments, data stored in status registers 316 can be provided to controller 302 (e.g., via bus 361), and a counter in controller 302 (not shown) can count the number of alarms and warnings generated during a predetermined time interval.

Statistics registers 360 include a first block of registers 362-0A, 362-0B, . . . 362-0Y, a second block of registers 362-1A, 362-1B, . . . 362-1Y, a third block of registers 362-2A, 362-2B, . . . 362-2Y, . . . and an Xth block of registers 362-XA, 362-XB, . . . 362-XY, where X+1 is a number of monitored operating and/or statistical parameters for which statistical information is desired or requested, and Y is a number of statistical operations and/or time periods over which each of the parameters are monitored. X can be zero or any positive integer (e.g., three or more), and Y can be any positive integer greater than or equal to two (e.g., greater than or equal to four, six, eight, or more). Statistics registers 360 receive statistical information (e.g., outputs of statistical calculations) from statistics logic 380 on bus 363. The statistical information may include a maximum value, one or more rates, a minimum value, one or more average values, a root mean square (RMS) value, and/or one or more standard deviations of an operating parameter.

For example, statistics register 362-0A may store an average value of a first group of parameter registers (e.g., registers 318-0A though 318-0N), statistics register 362-0B may store a maximum value of the first group of parameter registers, statistics register 362-0C may store a minimum value of the first group of parameter registers, statistics register 362-0D may store a standard deviation of the first group of parameter registers, etc. Similarly, if a time period for taking samples corresponding to the first group of parameter registers 318-0A though 318-0N is known, a rate of change in the value of the first parameter can be stored in statistics register 362-0E, for example.

Statistics logic 380 may comprise a plurality of statistics determination and/or calculation blocks (e.g., an average value logic block 381, a standard deviation logic block 382, a maximum value logic block 383, a minimum value logic block 384, a data rate logic block or calculator 385, and a root mean square [RMS] value block 386) configured to perform statistical calculations or analysis on received parameter values. Average value logic block 381 is generally configured to determine an average value of a monitored parameter over a predetermined time interval or over a number (e.g., a predetermined number) of samples. Standard deviation logic block 382 is generally configured to determine a standard deviation of a parameter value monitored or sampled during a predetermined time interval or over a (predetermined) number of samples. Maximum value and minimum value logic blocks 383 and 384 are generally configured to determine a maximum value and a minimum value, respectively, of one or more operating parameters during a predetermined time interval or over a (predetermined) number of samples. Rate block or rate calculator 385 is generally configured to determine a rate (e.g., a rate of increase or decrease) of one or more of the monitored parameter values per unit time (e.g., per minute, per hour, per day, etc.). RMS value block is generally configured to determine a RMS value of one or more operating parameters during a predetermined time interval or over a (predetermined) number of samples. Additionally, buses and/ or signals 320, 322, 324, 325, 326, 327, 328, 329, 334, 361, 363, and 365 shown in FIG. 3 may represent more detailed versions of the bus(es) 210 shown in FIG. 2.

Statistics logic blocks 372-376 can determine statistical information in a fashion similar to that described above with respect to average value logic block 371. For example, using conventional standard deviation calculation circuitry, standard deviation logic block 372 can calculate a standard deviation of the first subgroup of parameter registers and provide a result of the calculation to statistics registers 360 (e.g., statistics register 362-0G), maximum value logic block 373 can determine a maximum value of the first subgroup of parameter registers and provide a result of the determination to statistics register 362-0H, minimum value logic block 374 can determine a minimum value of the first subgroup of parameter registers and provide a result of the determination to statistics register 362-0I, and rate logic block 374 can calculate a rate (e.g., a change of value over time) of the first subgroup of parameter registers and provide a result of the calculation to statistics register 362-0J. Thus, each of the statistics logic blocks 372-376 calculates or determines statistical information on parametric data and provides a result of the calculation and/or determination to statistics registers 360.

Once the variation thresholds and variation information are stored in memory 160, the variation thresholds and variation information can be provided to comparator 307 (e.g., via buses 320 and 365). Comparator 307 can be used to compare variation information stored in any of the statistics registers 360 to corresponding variation thresholds stored in threshold registers 312. More specifically, variation generation and status indication controller 302 can instruct memory 160 to provide thresholds from registers 312 (e.g., via bus 320) and corresponding variation data/information from registers 360 (e.g., via bus 365) to comparator 307. The instruction can be performed automatically or based on a (register) identifier (e.g., from address and pointer memory 112 or a status request).

For example, data stored in variation register 352-0A (e.g., a first variation range or value of a first group of parameter values) and threshold data stored in threshold registers 314-0A and 314-0B (e.g., corresponding warning and alarm thresholds) can be provided to comparator 307. Comparator 307 can then compare the received data and provide a result of the comparison (e.g., a status indication) to status registers 316. The first variation status indication may be represented by indicators such as or corresponding to "NORMAL," "WARNING," or "ALARM." Thus, if comparator 307 determines that the first variation in the first group of parameter values is greater than the corresponding warning threshold, a "WARNING" status indication may be generated and stored in status registers 316 (e.g., status indication register 318-2A).

Alternatively, data stored in variation register 352-1A (e.g., a first variation range or value of a second group of parameter values) and threshold data stored in threshold registers 314-1A and 314-1B (e.g., corresponding high and low thresholds) can be provided to comparator 307. Comparator 307 can then compare the received data and provide a result of the comparison (e.g., a status indication) to status registers 316. The variation status indication may be represented by indicators such as or corresponding to "NORMAL," "HIGH," or "LOW." Thus, if comparator 307 determines that the first variation in the second group of parameter values is continually increasing, a "HIGH" status indication may be generated and stored in status registers 316 (e.g., status indication register 318-3A).

Similarly, comparator 307 can be used to compare variation information stored in any of the variation registers 350 to corresponding thresholds stored in threshold registers 312. For example, variation information stored in variation register 362-4D (e.g., a variation in a fourth operating parameter over a fourth period of time) can be compared to corresponding threshold values in threshold registers 314-4E through 314-4H. The status indications resulting from such comparisons may be represented by indicators such as or corresponding to "NORMAL," "LOW ALARM," "LOW WARNING," "HIGH WARNING," "HIGH ALARM," etc. Alternatively, the indication may be a flag or a state (see, e.g., U.S. patent application Ser. No. 13/348,599, filed Jan. 11, 2012, the relevant portions of which are incorporated by reference herein). Once the status indications and statistical information have been determined and stored in memory 160, the status indications and statistical information can be provided to an external device (e.g., a host) and/or the network (e.g., via interface controller 114). The status indications and statistics information can be provided automatically, or by a request from a host or other external device.

Thus, the present optical transceiver can be viewed as including a type of "black box," in which a variety of control and/or variation information on one or more operating parameter(s) is calculated and stored prior to failure of the transceiver and/or network. Such variation information can be used to improve failure analysis by providing operational details of the optical transceiver just prior to failure. The present transceiver can also provide more accurate information regarding trends in transceiver operation, and possibly predict an impending transceiver failure. The present transceiver advantageously dynamically calculates the DDM variation rate in the module, triggering an alarm (e.g., low alarm, low warning, high warning, or high alarm).

An Exemplary Optical and/or Optoelectronic Transceiver

Figure 4:
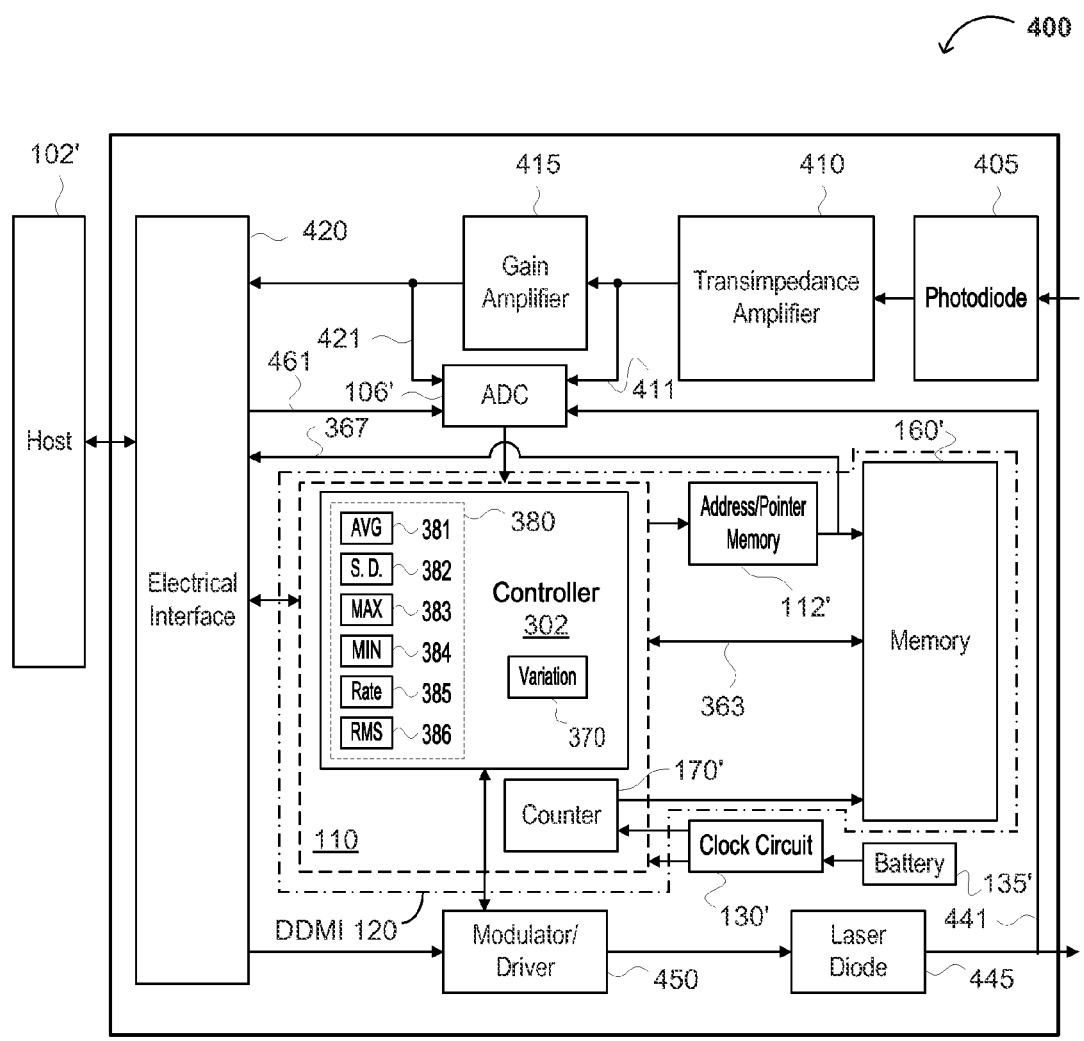
FIG. 4 is a diagram showing an exemplary optical and/or optoelectronic transceiver according to the present invention.

FIG. 4 shows an exemplary optical and/or optoelectronic transceiver 400 according to the present invention. Optical and/or optoelectronic transceiver 400 is configured to monitor at least one operating parameter related to transceiver operation, track variation information and provide status indication(s) regarding the same. As shown, optical transceiver 400 comprises photodiode 405, transimpedance amplifier (TIA) 410, gain amplifier 415, electrical interface 420, DDMI 120, CPU 110, ADC 106', address and pointer memory 112', memory 160', clock circuit 130', battery 135', modulator and/or driver 450, and laser diode 445. Photodiode 405 can be any device configured to receive an optical signal (e.g., over an optical fiber from an optical transmitter such as optical transmitter 150 in FIG. 1) and provide an electrical signal. For example, photodiode 405 can be an avalanche photodiode (APD) or a p-type/intrinsic/n-type (PIN) photodiode. TIA 410 is configured to convert a current received by photodiode 405 into a corresponding voltage. Gain amplifier 415 is configured to amplify a voltage received by TIA 410. In some embodiments, gain amplifier 415 is a buffer. In other embodiments, gain amplifier 415 is a variable gain amplifier.

Electrical interface 420 can be any interface capable of accurately transferring data and/or signals between external host 102' and components of the optical transceiver 400 (e.g., statistics generation and status indication controller 302 having a variation calculating block 370, modulator and/or driver 450, etc.). ADC 106' can be the same as or similar to ADC 106 discussed above with respect to FIGS. 1-3. As shown, CPU 110 comprises counter 170 and statistics logic 380, as discussed above with respect to FIG. 3. That is, CPU 110 comprises average value logic block 371, standard deviation value logic block 372, maximum value logic block 373, minimum value logic block 374, rate logic block 375, and RMS value logic block 376. External host 102' can be the same as or similar to host 102 discussed above with respect to FIG. 1 (e.g., a host processor, circuit board, stand-alone optical network device, etc.). Modulator and/or driver 450 is generally configured to adjust and/or provide a driving current provided to laser diode 345. Laser diode 445 (which may be included in a transmitter optical subassembly [TOSA], not shown) may comprise a directly modulated laser (DML), an electro-absorption modulated laser (EML), a distributed feedback laser diode (DFB-LD), or other laser configured to generate and/or transmit an optical signal over an optical fiber in an optical and/or optoelectronic network. Memory 160' may be the same as or similar to memory 160 discussed above with respect to FIGS. 1-3, and be configured to store data (e.g., variation information, threshold values, parameter values, etc.) received from CPU 110 (or for use by CPU 110), and addresses received from address and pointer memory 112'. Address and pointer memory 112' may be similar to address and pointer memory 112 discussed above with respect to FIG. 2. Similarly, clock circuit 130' and battery 135' may the same or similar to those discussed above with respect to FIGS. 1-3. The DDMI 120 includes the CPU 110, pointer memory 112', and memory 160'.

In general, an electrical data signal is received from an external device (e.g., host 102'), and provided to optical transceiver 400 via electrical interface 420. Once the data signal is received, modulator/driver 450 transmits an electrical signal and/or current to laser diode 445. In addition, an optical data signal is received at photodiode 210. The received optical data signal is converted by photodiode 210 to an electrical signal (e.g., a current), which is then provided to TIA 410. TIA 410 receives the electrical signal and provides a signal (e.g., a voltage) 411 to gain amplifier 415. Gain amplifier 415 provides an amplified signal 421 to electrical interface 420. In some embodiments, operational data related to the signals 411 and/or 421 are also provided to CPU 110 via ADC 106.

As discussed above, optical and/or optoelectronic transceiver 400 is configured to monitor at least one operating parameter related to transceiver operation. The operating parameter(s) may include a temperature, a voltage, a current, an optical power, an output power, a modulation amplitude, a frequency, an amplifier gain, a channel spacing, a wavelength, etc. For example, the operating parameter may include an output power provided to ADC 106' (e.g., an output power of laser diode 445 via signal 441). Additionally or alternatively, the operating parameter may include a voltage (e.g., of an output signal 411 of TIA 410), a current (e.g., from modulator/driver 450), a gain (e.g., provided by gain amplifier 415 at signal 421), and/or a temperature (e.g., of laser diode 445). In most embodiments, the monitored operating parameters are provided to ADC 106', which is configured to sample various measured parameter values and provide the sampled parameter values to CPU 110 for subsequent processing.

Once the operating parameter(s) are sampled by ADC 106', CPU 110 can determine and/or obtain variation information on the sampled parameter values and status indications for the variations, as described herein. Once the variation information is obtained and/or determined, the variation information (as well as the sampled parameter values) can be provided to memory 160' (e.g., via bus 363). For example, the data output from controller 302 may include a comparison result and/or variation information, such as a numerical deviation (including the direction of deviation, indicated by a "+" or "−" sign or indicator) from a target value, or a percentage variation from a target or predetermined value (e.g., provided by variation calculator 370). In some embodiments, an output from CPU 110 (e.g., provided by controller 302) can be provided to memory 160' via bus 363. In any embodiment, data output from controller 302 is provided to corresponding registers (not shown) in memory 160' and/or address and pointer memory 112', when address and pointer memory 112' comprises a cache memory.

For example, as discussed above, an output power of laser diode 445 can be sampled by ADC 106 via bus(es) 441, and output power value data can be provided to CPU 110. The output power value data can then be provided to, for example, a parameter register in memory 160' (e.g., as discussed above with respect to FIG. 3). CPU 110 can compare the output power value data to corresponding thresholds stored in memory 160' and determine a status indication. Once calculated, the status indication can be stored in a status indication register. Additionally, the output power value data (e.g., stored in a parameter register in memory 160') can be provided to variation logic 370 so that variation data and/or information can be calculated thereon. Once calculated, the variation information on the output parameter power values can be stored in memory 160' (e.g., in one or more variation registers). When a request for variation information and/or a status indication is received from host 102 via electrical interface 420, data stored in address and pointer memory 112 or memory 160 can be provided to electrical interface 420 via bus 367 and subsequently provided to host 102. Similar techniques and/or methods can be utilized to determine status indications and calculate variation information on other parameter values.

Thus, the present optical transceiver can be used to generate and/or calculate and store variation information and status indications regarding parameters related to transceiver operations. The information can be provided to a user via a digital diagnostic monitoring interface (DDMI). The present optical transceiver can be viewed as including a type of "black box," in which a variety of variation information on one or more operating parameter(s) is obtained and/or determined and stored during operation (and prior to failure) of the transceiver. Such variation information can be used to improve failure analysis by providing operational details of the optical transceiver just prior to failure. The present transceiver can also provide more accurate information regarding trends in transceiver operation, and possibly predict an impending transceiver failure.

An Exemplary Method of Tracking a Variation in One or More Operational Parameters in an Electronic Device A method of tracking a variation in one or more operating parameters in an electronic device may include (i) monitoring one operating parameters of the electronic device over time to determine a plurality of parameter values for each of the operating parameters and at least one corresponding time interval over which the parameter values are determined, (ii) calculating a variation in each of the operating parameters as a function of time, (iii) comparing the variation in each of the operating parameters to one or more predetermined thresholds, each of the predetermined thresholds corresponding to an operational warning or alarm, and (iv) generating the operational warning or alarm when the variation exceeds the corresponding thresholds. The optical transceiver may have n operational parameters, where n is a positive integer greater than or equal to 1 (e.g., 1, 2, or more). In further embodiments, generating the operational warning or alarm comprises crossing at least one of the predetermined thresholds in a predetermined direction.

In another embodiment, a method of tracking a variation in one or more operating parameters in an electronic device can include setting one or more predetermined thresholds based on a permissible variation of a parameter value, and calculating a difference between at least two parameter values. This may include storing the parameter values in a memory location corresponding to a particular operational parameter, and transmitting at least two of the parameter values to a difference calculator or to an external device.

The external device may interface with or be included in a digital diagnostic monitoring interface (DDMI). The DDMI is configured to track and store the variation, data of at least one operational parameter, at least one corresponding time interval, and one or more predetermined thresholds.

In various embodiments, the alarm or warning is generated when the variation crosses at least one of the predetermined thresholds in a predetermined direction. In some cases, the electrical device may be shut down when the variation exceeds the alarm threshold.

In some embodiments, tracking a variation in one or more operating parameters in an electronic device can include measuring a time difference between times at which the parameter values are taken. In various embodiments, tracking the variation can include storing the variation(s) in each of the operating parameters in one or more predetermined locations in a memory. The predetermined location(s) in the memory is or are reserved for storing variations of the operating parameters.

The predetermined threshold may include at least two members of the group consisting of a low warning threshold, a high warning threshold, a low alarm threshold, and a high alarm threshold. More specifically, each of the predetermined thresholds may be a variance from a target value (e.g., ±0.5° C., ±0.5 V, ±10 mA, etc.). Alternatively, at least one of the thresholds may be a percentage difference from a target value (e.g., ±15%).

In various embodiments, the operating parameters include a laser temperature, a module temperature, optical receiver temperature, a regulated voltage, a bias voltage, a common mode voltage, a bias current, a transmitted optical digital power, a received optical digital power, a received optical video power, a radio-frequency (RF) output power, a modulation amplitude, a modulation frequency, time, an amplifier gain, a channel spacing, a laser frequency, a laser wavelength, and/or variation parameters for statistical data and/or parameters such as average value, maximum value, minimum value, standard deviation, rate of change, and root-mean-square variation.

As shown in FIG. 5, flow chart 500 illustrates an exemplary method of monitoring parametric data, generating variation information, and/or generating status indications for the variation data in an optical and/or optoelectronic device. The method typically involves continuous processing through various loops in the flow, although it also encompasses a single pass through part or all of the flow. For example, in the method 500, and upon stable application of power (e.g., from an external power source), the optical transceiver may continuously send and/or receive optical transmissions (e.g., to and from an optical network), and continuously and/or periodically process parametric data and/or variation information relating to the parametric data.

The method begins at 505, where one or more parameters related to optical transceiver operation are monitored. For example, referring to FIG. 2, monitoring the optical parameters may include CPU 110 enabling the sampling of parametric data by ADC 106 (e.g., via an enable signal such as signal 216). In some embodiments, the parametric data is sampled at 250 millisecond time intervals, 10 second time intervals, 6 minute time intervals, and/or 1 hour time intervals. As discussed above with respect to FIGS. 3 and 4, the operating parameter(s) may comprise a temperature, a voltage, a current, an optical power, an output power, a modulation amplitude, a frequency, an amplifier gain, a channel spacing, and/or an output or input wavelength.

At 510, the parametric data are stored in memory. For example, and referring to FIG. 2, the parametric data can be transferred from ADC 106 to a suitable location (e.g., a location determined or allocated by CPU 110) in memory 160 (e.g., parameter registers 308 in FIG. 3). Also, the time at which the data were sampled and/or stored is also stored in memory, generally at the same time as the parametric data. In some embodiments, the parametric data is stored in designated parametric value registers, and the time information may be stored in one or more time interval registers. Alternatively, time information can be stored in a predetermined location in the same memory as the parametric data, or as part of the parameter data (e.g., as the 8 least significant bits of 16-bit data word; the 16 least significant bits of 32-bit data word, etc.). Additionally, in some embodiments, parameter values can be obtained at predetermined time intervals and stored in predetermined and/or designated parameter registers. Values for different operating parameters can be stored in different register groups, and values for the same operating parameter taken at different time intervals can be stored in different register subgroups.

At 515, the variation in the stored parametric data is calculated as a function of time. For example, as discussed above, the variation in the monitored parameter(s) may be calculated over various time intervals or periods (e.g., a second, a minute, an hour, a day, a week, a month, etc.). The variation may be calculated and/or determined as discussed above using a variation calculator and/or controller, such as variation block 370 in controller 302 in FIG. 3. Additionally, variations of a number of groups of parameter registers (e.g., registers 310-0A through 310-0F in FIG. 3) can be calculated. Different groups of parameter registers for the same operating parameter may represent samples taken over different time periods, such as a one minute, one hour, one day, one week, etc.

At 520, the variations are stored in one or more memories. For example, referring to FIG. 3, the variation values may be stored in variation registers 350 in memory 160'. For example, a variation in the laser diode temperature for a first time interval may be stored in a first variation register, a variation in a second operating parameter (e.g., a bias current) may be stored in a second variation register, etc. Alternatively, a third variation register may store the variation across a first group of parameter registers (e.g., registers 352-0A though 352-0W), etc.

At 530, the parametric data stored in memory are compared to the corresponding thresholds. In some embodiments, the thresholds are predefined and stored in memory (e.g., in threshold registers 312 in FIG. 3). For example, the memory may comprise dynamically allocated memory (see, e.g., U.S. patent application Ser. No. 13/070,358 filed Mar. 23, 2011, the relevant portions of which are included herein by reference). Additionally, in some embodiments, the thresholds may be stored as bit-reduced threshold values, which can be used as different mathematical representations or manifestations of the stored thresholds (see, e.g., U.S. patent application Ser. No. 13/075,092, filed Mar. 29, 2011, the relevant portions of which are included herein by reference). The thresholds can include (i) a high threshold and a low threshold (e.g., for an operating voltage or supply voltage), (ii) a warning threshold and an alarm threshold (e.g., for a laser temperature, optical receiver temperature, etc.), and/or (iii) a low warning threshold, a low alarm threshold, a high warning threshold, and a high alarm threshold, in which a result of the comparison can be stored as a state (see, e.g., U.S. patent application Ser. No. 13/348,599, filed Jan. 11, 2012, the relevant portions of which are included herein by reference). As discussed above, the thresholds may be stored as percentage variances (e.g., when the monitored parameter value is stored as a percentage variance from a target operating condition/parameter value) or numerical values (see, e.g., U.S. patent application Ser. No. 13/371,313 filed Feb. 10, 2012, the relevant portions of which are included herein by reference).

At 525, the variation values are compared to thresholds stored in memory. The thresholds (e.g., variation thresholds) may be predefined and stored in memory (e.g., in threshold registers 312 in FIG. 3). The thresholds may include warning or alarm thresholds (e.g., temperature variation warning or alarm thresholds), one or more control thresholds (e.g., whether the variation exceeds an upper limit to the absolute value of the difference of the maximum and/or minimum value of a given operating parameter and the target value), a plurality of different thresholds for a particular parameter over various time intervals or periods (e.g., a second, a minute, an hour, a day, a week, a month, etc.), etc.

At 540, the method determines whether the optical transceiver has received a read command or request. The read command or request may be received from a host (e.g., host 102 in FIG. 4) or other external device (e.g., via interface controller 114 in FIG. 3). The read command or request may be a request for variation information, thresholds (e.g., variation thresholds), one or more current parameter values, one or more status indications regarding the monitored operating parameter values stored in memory, etc. If a read command is received, then the method proceeds to 545, and the optical transceiver provides the variation values and/or other data related to transceiver operation to the device requesting the variation values and/or data. After the requested information has been provided to the host or other external device, the method returns to 505, and continues monitoring the operating parameter(s) related to transceiver operation.

If a read command is not received at 540, then the method determines if the result of the comparison between the variation values and corresponding thresholds, is within an acceptable range (e.g., below a first high threshold and above a first low threshold) at 550. For example, the method may involve comparing variation values (e.g., stored in one of variation registers 350 in FIG. 3) to corresponding thresholds (e.g., stored in a [sub]set of threshold registers 312 in FIG. 3). As discussed above, some of the thresholds may be stored as percentage variances or numerical values (see, e.g., U.S. patent application Ser. No. 13/371,313, filed Feb. 10, 2012, the relevant portions of which are incorporated by reference herein). Additionally, at 550, the method determines if the comparison results determined at 520 (e.g., a comparison between stored parametric data and parametric data thresholds) are within an acceptable range. If the comparison results are within an acceptable range (e.g., a monitored parameter value is between high and low warning thresholds), the method proceeds to monitoring one or more parameters related to transceiver operation.

However, if the comparison results are not within an acceptable range (e.g., a monitored parameter value is greater than a high warning threshold, or an average parameter value is less than a low average value threshold), the method generates a corresponding status indication and may send the status indication to a host or external device at 555. The status indications may be represented by indicators such as or corresponding to "OVER CONTROL LIMIT," "UNDER CONTROL LIMIT," "WARNING," "ALARM," and high and low variations thereof (e.g., "LOW WARNING," "HIGH ALARM," etc.). The status indication may be automatically provided to an external device in the network including the optical transceiver (e.g., via a communication interface such as a DDMI). After the status indication is sent, the method returns to 505, and continues monitoring the parameter(s) related to transceiver operation.

The optical transceiver of the present invention may advantageously forecast potential problems that may occur in the transceiver and/or network, and notify the user of the system and/or optical device to take action prior to the problem occurring. For example, the present optical transceiver may dynamically calculate the variation in the temperature of the optical transmitting device (e.g., the laser diode). For example, the variation in temperature of the laser diode directly indicates the cooling capability of the transceiver. If this variation is consistently in one direction (e.g., the temperature is either always increasing or decreasing) when conditions are set so that the transmitter temperature should remain constant, an algorithm may calculate the time remaining in which the operational temperature of the optical device may exceed preset boundary and/or operational parameters, and continue to be able to be brought back within operational limits.

Another example includes dynamically calculating the variation in the output optical power of optical device to determine how much time is left before the device enters an End-Of-Life (EOL) time or period. As a result, the present method may further comprise forecasting and/or notifying a user that the optical device should be replaced before the device reaches its EOL. This capability can prevent or minimize the adverse effect on data connection(s) and/or system performance of a device that is likely to fail in the foreseeable future.

In addition, the variation in the input optical power may be used to monitor other local optical transmitters. Although the received optical signal power (e.g., the "receiver power") is similar to the output optical power, the variation of the receiver power may be used to monitor performance of remote/local optical transmitters and predict an EOL event for remote/local optical transmitters.

Thus, the present method can advantageously provide an approach for monitoring control functions and/or parameters of an optical transceiver in real time, over a predetermined time interval, or over the entire operating life of the optical transceiver. The present method can provide more accurate information regarding trends in optical transceiver operation, predict an impending transceiver failure, and be used to enhance failure analysis by providing details of the optical transceiver just prior to failure.

CONCLUSION/SUMMARY

Embodiments of the present invention can advantageously provide an approach for monitoring an optical transceiver in real time, over a predetermined time interval, or over the entire operating life of the optical transceiver. A current value of a monitored operating parameter and an average operating parameter value (over a predefined time interval) can be stored and compared to predefined thresholds to determine whether components and/or circuitry in the optical transceiver are operating within an acceptable range. That is, the present invention can provide more accurate information regarding trends in optical transceiver operation, predict an impending transceiver failure, and be used as a type of "black box" to enhance failure analysis by providing details of the optical transceiver just prior to failure.

While the above examples include particular implementations of registers and other memory arrangements, as well as comparators and other logic, one skilled in the art will recognize that other designs and arrangements may also be used in accordance with embodiments. For example, other digital logic or elements can be used in certain embodiments. Further, one skilled in the art will recognize that other forms of signaling and/or control (e.g., current-based signaling, flag-based signaling, differential signaling, etc.) may also be used in accordance with various embodiments.

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of tracking a variation in one or more operating parameters in an electronic device, the method comprising:
   (a) monitoring said one or more operating parameters of said electronic device over time to determine a plurality of parameter values for each of said one or more operating parameters and a corresponding time interval over which said parameter values are determined;
   (b) calculating said variation in each of said one or more operating parameters as a function of time by calculating a difference between (i) at least two of said plurality of parameter values during said corresponding time interval or (ii) one of said plurality of parameter values during said corresponding time interval and a target value for a corresponding operating parameter, and dividing said difference by said corresponding time interval;
   (c) comparing said variation in each of said one or more operating parameters to one or more predetermined thresholds, each of said one or more predetermined thresholds corresponding to an operational warning or alarm; and
   (d) generating said operational warning or alarm when said variation exceeds said corresponding threshold.

2. The method of claim 1, further comprising setting said one or more thresholds based on a permissible variation of said parameter values, and calculating said difference comprises calculating said difference between a minimum and a maximum of said parameter values over said corresponding time interval.

3. The method of claim 1, further comprising measuring a time difference between times at which said parameter values are taken, wherein said time difference is said corresponding time interval.

4. The method of claim 1, further comprising storing said variation in each of said one or more operating parameters in a predetermined location in a memory.

5. The method of claim 1, wherein each of said one or more predetermined thresholds is said target value.

6. The method of claim 1, wherein at least one of said one or more predetermined thresholds is a percentage difference from said target value.

7. The method of claim 1, wherein said one or more operating parameters comprises at least one member of the group consisting of a laser temperature, a module temperature, optical receiver temperature, a regulated voltage, a bias voltage, a common mode voltage, a bias current, a transmitted optical digital power, a received optical digital power, a received optical video power, a radio-frequency (RF) output power, a modulation amplitude, a modulation frequency, time, an amplifier gain, a channel spacing, a laser frequency, and a laser wavelength.

8. The method of claim 1, wherein said one or more predetermined thresholds comprises at least two members of the group consisting of a low warning threshold, a low alarm threshold, a high warning threshold, and a high alarm threshold.

9. The method of claim 1, wherein generating said operational warning or alarm comprises crossing at least one of said one or more predetermined thresholds in a predetermined direction.

10. The method of claim 9, wherein calculating said difference comprises storing said parameter values in a memory location corresponding to a corresponding operational parameter, and transmitting at least two of said parameter values to a difference calculator or to a digital diagnostic monitoring interface.

11. The method of claim 1, further comprising shutting down the electrical device when said variation exceeds said alarm threshold.

12. An optical transceiver, comprising:
    (a) an optical receiver configured to receive optical data;
    (b) an optical transmitter configured to transmit optical data;
    (c) one or more memories configured to store (i) parametric data for at least one operational parameter of said transceiver, (ii) a corresponding time interval during which said parametric data were determined, and (iii) one or more predetermined thresholds for each of one or more variations in each of said at least one operating parameter, each of said one or more predetermined thresholds corresponding to an operational warning or alarm; and
    (d) logic configured to (i) calculate said one or more variations in said at least one operating parameter as a function of time from said parametric data and said time interval by calculating a difference between (i) at least two of said parametric data during said corresponding time interval or (ii) one of said parametric during said corresponding time interval and a tar et value for a corresponding operating parameter, and dividing said difference by said corresponding time interval, (iii) compare said one or more variations to at least one of said one or more predetermined thresholds, and (iv) generate said operational alarm or warning when any of said one or more variations exceeds said at least one threshold.

13. The optical transceiver of claim 12, further comprising an interface configured to (i) receive a request from an external device for at least one value of said parametric data, (ii) provide said at least one value to said external device in response to said request, and (iii) provide said alarm or warning.

14. The optical transceiver of claim 13, wherein said interface is further configured to receive said at least one alarm or warning threshold from said external device.

15. The optical transceiver of claim 12, further comprising one or more analog-to-digital converters (ADCs) coupled to said optical transmitter and said optical receiver, wherein each of said one or more ADCs converts an analog value of one of said at least one operational parameter to a digital value.

16. The optical transceiver of claim 15, wherein said one or more memories comprises a register configured to store said parametric data relating to said one of said at least one operational parameter from a corresponding one of said one or more ADCs.

17. The optical transceiver of claim 12, wherein said one or more memories and said logic are included in a digital diagnostic monitoring interface.

18. The optical transceiver of claim 17, wherein said digital diagnostic monitoring interface is configured to track and store said variation(s), said parametric data for said at least one operational parameter, said corresponding time interval, and said one or more predetermined thresholds.

19. The optical transceiver of claim 12, wherein said one or more predetermined thresholds comprises at least two members of the group consisting of a low warning threshold, a high warning threshold, a low alarm threshold, and a high alarm threshold.

20. The optical transceiver of claim 12, wherein said logic is configured to generate said alarm or warning when said variation crosses at least one of said one or more predetermined thresholds in a predetermined direction.

21. The optical transceiver of claim 12, wherein said at least one operating parameter comprises at least one member of the group consisting of a laser temperature, a module temperature, optical receiver temperature, a regulated voltage, a bias voltage, a common mode voltage, a bias current, a transmitted optical digital power, a received optical digital power, a received optical video power, a radio-frequency (RF) output power, a modulation amplitude, a modulation frequency, time, an amplifier gain, a channel spacing, a laser frequency, and a laser wavelength.

22. The optical transceiver of claim 12, wherein each of said one or more predetermined thresholds is said target value.

23. The optical transceiver of claim 12, wherein at least one of said thresholds is a percentage difference from said target value.

24. The optical transceiver of claim 12, wherein said logic is configured to shut down said transceiver when said variation exceeds said alarm threshold.

25. The optical transceiver of claim 12, wherein said logic comprises a subtractor that determines the difference between said minimum value and said maximum value of said parametric data for each of said at least one operational parameter over said at least one corresponding time interval, and a divider that divides the difference over the corresponding time interval.

26. The optical transceiver of claim 12, wherein said logic is further configured to measure a time difference between times at which said parametric data are stored, wherein said time difference is said corresponding time interval.

\* \* \* \* \*